Jan. 30, 1951 C. G. TREADWELL 2,539,497

SIGNALING OVER ELECTRIC PULSE COMMUNICATION SYSTEM

Filed July 17, 1947

Inventor
Cyril Gordon Treadwell
By Robert Harding Jr.
Attorney

Patented Jan. 30, 1951 2,539,497

UNITED STATES PATENT OFFICE 2,539,497

SIGNALING OVER ELECTRIC PULSE COMMUNICATION SYSTEM

Cyril Gordon Treadwell, London, England, assignor to International Standard Electric Corporation, New York, N. Y.

Application July 17, 1947, Serial No. 761,662
In Great Britain July 8, 1946

Section 1, Public Law 690, August 8, 1946
Patent expires July 8, 1966

9 Claims. (Cl. 179—15)

The present invention relates to signalling arrangements for electric pulse communication systems.

In commercial speech transmission systems it is necessary to transmit calling, dialling and other control signals over the speech channels. When voice-frequency signalling apparatus is available, there are no special requirements in the case of a pulse communication system, since the signalling currents are transmitted precisely in the same way as the ordinary voice currents. However, it may be inconvenient or expensive to provide such voice-frequency signalling apparatus in some circumstances, and so an alternative inexpensive method of transmitting such signals over a pulse system is required.

According to one proposed method of signalling over any channel of a multi-channel time-phase modulation pulse system, the pulses of the channel are suppressed altogether during the transmission of a calling or control signal.

This method is, however only suitable for very simple ring-down signalling arrangements, and is incapable of satisfying the requirements of many commercial systems, as will be made clear later.

The principal object of the present invention is to provide a method of signalling which meets the requirements of such commercial systems, and this is achieved by providing an arrangement for the transmission of a control signal over a channel of a time-modulation electric pulse communication system comprising means at a transmitter operated by the said control signal for shifting the pulses of the channel from one given time position to another, and means at a receiver responsive to the shifting of the pulses for operating a signal device.

The invention also provides an arrangement for signalling over a channel of a time-modulation electric pulse communication system comprising means at a transmitter operated by a control signal for shifting the pulses of the channel from a displaced time position to a central time position, and means at a receiver responsive to the shifting of the pulses for producing a change of direct potential for operating a signal device.

The invention further provides an arrangement for receiving control signals transmitted over a channel of a time-modulation electric pulse communication system, the said control signals being characterised by a shift of the channel pulses from one given time position to another, comprising means for producing a change of direct current in response to the said shift, and means for applying the said change to operate a signal device.

The invention also provides an arrangement for receiving control signals transmitted over a channel of a time modulation electric pulse communication system, the said control signals being characterised by a shift of the channel pulses from one given time position to another, comprising means for deriving from the received channel pulses rectangular pulses whose duration is determined by the time position of the channel pulses, integrating means controlled by the said rectangular pulses for building up a potential of magnitude corresponding to the said time position, and means for applying the said potential to operate a signal device when the said magnitude corresponds to one of the given time positions the last mentioned means being also adapted to block the said potential when its magnitude corresponds to the other given time position.

The invention will be described with reference to the accompanying drawing in which.

Figures 1, 2, 3:
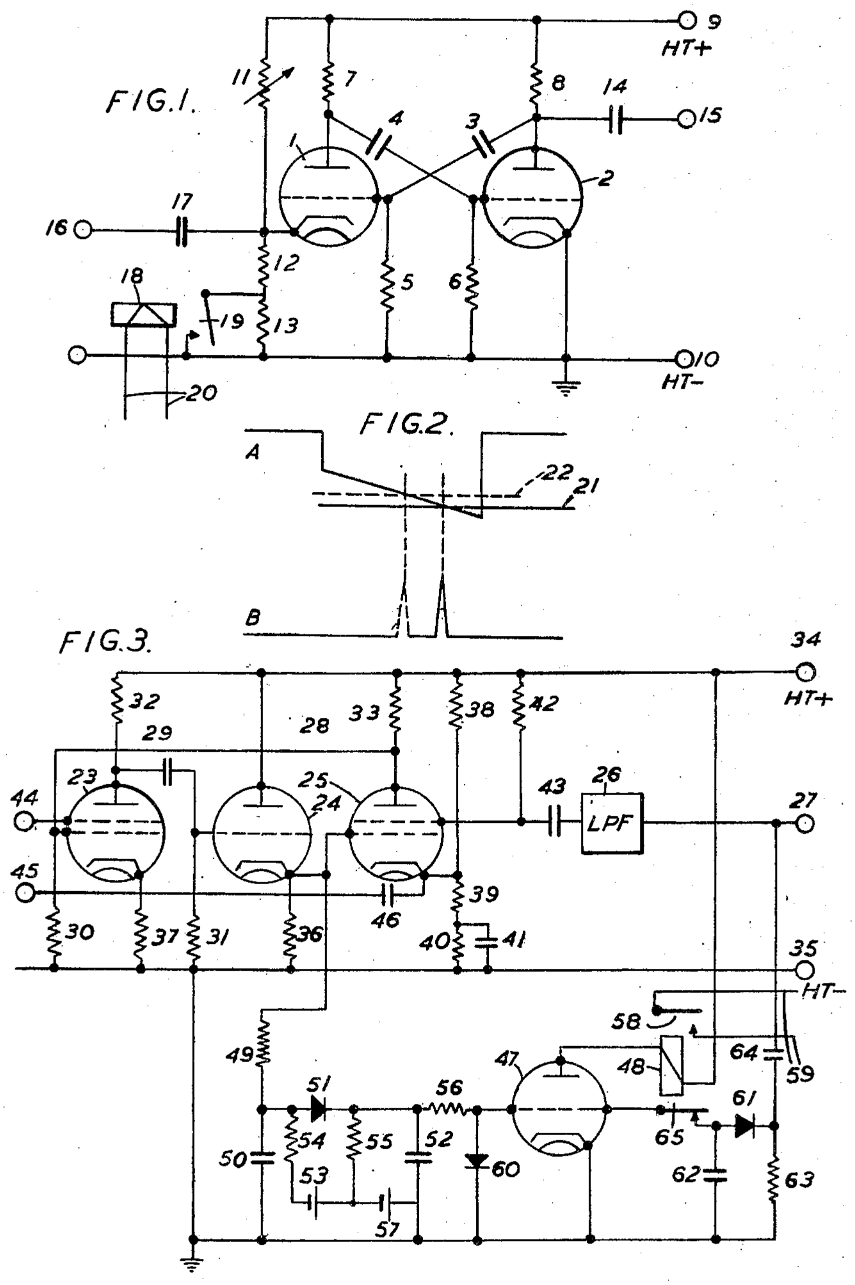
Fig. 1 shows an example of a circuit for generating the channel pulses and for transmitting the control signals, according to the invention.
Fig. 2 shows diagrams illustrating the operation of Fig. 1.
Fig. 3 shows a schematic circuit diagram of an arrangement according to the invention for receiving the control signals.

In a time-modulation pulse transmission system, speech is usually conveyed in the two directions over separate channels. When the channels are set up for conversation, each channel pulse when unmodulated is timed to occur at the centre of the corresponding time period allotted to the channel, and when modulated may therefore make equal excursions on either side of the centre. However, in the arrangement according to the present invention, when a channel is idle, each channel pulse is timed about a quarter of the channel period later than the time corresponding to the central position. This condition of the channel will be called the "unseized" condition. As soon as a caller lifts his receiver to make a call, a relay operates to shift the channel pulses to the centre of the timed period. This condition of the channel will be called the "seized" condition.

If the called party is engaged, it is necessary to return busy tone to the caller, and this will have to be transmitted by the return channel, which will be in the unseized condition. Furthermore it must also be necessary to return the number-unobtainable tone to the caller over this return channel. In some cases also, operators must be able to talk over channels when they are unseized. It will be clear therefore, that the system by which a signal is characterised by the suppression of channel pulses cannot carry out these functions.

In the system of the present invention, the channel pulses are unsymmetrically placed in the channel period when in the unseized condition, and this will permit the tones, and operators' conversations to be transmitted with a smaller depth of modulation, or with some distortion which can be tolerated in the circumstances.

When the circuit has been seized by the caller, dialling signals are transmitted by alternating the channel pulses between the seized and unseized positions, the final position after the termination of dialling being, of course, the seized position.

The present invention provides a receiving arrangement which will translate the shift of the channel pulses into a change in value of a direct current which can be used to operate an ordinary relay, while at the same time safeguarding the arrangement against false operation caused by the transmission of speech or tones.

Fig. 1 shows an example of an arrangement for generating the channel pulses for one of the channels of the system. It comprises a conventional multivibrator circuit comprising two similar valves 1 and 2, each control grid being cross-connected through a condenser 3 or 4 to the anode of the other valve. The control grids are also connected to ground through resistances 5 and 6, and the anodes are connected through resistances 7 and 8 to the positive terminal 9 for the high-tension operating source (not shown), the negative terminal 10 of which is grounded.

The cathode of the valve 1 is biassed positively by the chain of resistances 11, 12 and 13 connected in series between the terminals 9 and 10. The resistance 11 may be variable, as shown, to provide a convenient adjustment for the cathode bias. The cathode of the valve 2 is directly connected to ground, and the anode of this valve is connected through a blocking condenser 14 to an output terminal 15. An input terminal 16 is connected to the cathode of the valve 1 through a blocking condenser 17. A relay 18 has a pair of normally open contacts 19 connected across the resistance 13. The relay is intended to be operated by current supplied over conductors 20.

The multivibrator which has been described is of well-known type. The bias of the cathode of the valve 1 should be such that the anode current is cut off. The valve 2 will be conducting since the control grid potential will be slightly below that of the cathode.

In order to generate the channel pulses, negative pulses of trapezoidal form shown at A, Fig. 2 are applied at terminal 16. These pulses will be modulated in amplitude by the voice signals to be transmitted over the channel. Such trapezoidal pulses may be generated in various known ways which it is not necessary to explain for the purpose of the present invention. According to the invention, the bias of the cathode of the valve 1 is adjusted to the level indicated by the full line 21 shown in Fig. 2, which line cuts the sloping portion of the unmodulated trapezoidal pulse A at a time about a quarter of the channel period later than the centre of the period, so that the multivibrator will be switched over at this time and will generate a short pulse shown in the full line at B, Fig. 2, which pulse may be obtained from terminal 15, Fig. 1.

The resistances 12 and 13 are so selected that when the resistance 13 is short-circuited by the operation of the relay 18, the bias of the cathode is changed to a value corresponding to the dotted line 22 (Fig. 2) which cuts the unmodulated trapezoidal pulse A at the centre of the period, so that the channel pulse is now shifted to the centre, as shown dotted at B, Fig. 2.

Thus when the channel is unseized, each pulse will be generated a quarter of a period later than the centre of the period, and when current is supplied to the relay 18 to seize the channel, the pulse is shifted to the centre. When in the seized condition the trapezoidal pulse is modulated in amplitude by the speech currents, the multivibrator will be switched over earlier or later according to the speech waves, so that the channel pulses will be time-phase modulated, the total excursion allowable being half the channel period. When the channel is unseized, time phase modulation is still possible for the shifted pulses, but the depth of modulation which can be used without distortion will be halved. This will, however, allow for the transmission of tones and operators' speech as already explained.

Fig. 3 shows an example of receiving arrangement according to the invention for converting the time-shift of the channel pulses which occurs on seizing the circuit into a change of direct current which can be applied to operate a relay. In Fig. 3 the valves 23, 24 and 25 form a receiving multivibrator which converts the time-phase modulated pulses of one of the channels into time-duration modulated pulses, which are then demodulated by passing them through a low-pass filter 26 connected to an output terminal 27. This receiving multivibrator is similar to that shown in Fig. 1 except that the coupling between the anode of the valve 23 and the control grid of the valve 25 takes place through the amplifying valve 24 which is operated as a cathode follower. This circuit is described in the specification accompanying co-pending application No. 10,306/44. The elements 23, 25 and 28 to 35 in Fig. 3 correspond respectively to the elements 1 to 10 in Fig. 1. The cathode follower valve 24 has its anode connected directly to the positive high tension terminal 34 and its control grid to the junction point of elements 29 and 31, and its cathode is connected to the control grid of the valve 25 and to ground through a resistance 36. The cathode of the valve 23 is connected to ground through a resistance 37, and the cathode of the valve 25 is connected to a biassing resistance chain 38, 39 and 40 connected between the terminals 34 and 35. Resistance 40 is shunted by a by-pass condenser 41.

The output from the valve 25 is conveniently taken from an auxiliary grid which is connected to terminal 34 through a load resistance 42 and to the filter 26 through a blocking condenser 43. The channel pulses are applied to an input terminal 44 connected to an auxiliary grid of the valve 23. If the valves 23 and 25 are pentodes, the screen grid or the suppressor grid may be employed as the auxiliary grid. An input terminal 45 connected to the cathode of the valve 25 through a blocking condenser 46 is provided for the application of rectangular gating pulses having a duration substantially equal to the channel period.

The valves 23 and 25 should be biassed so that 23 is conducting and 25 is cut off. The channel pulses are applied in negative sense to the terminal 44 so as to produce positive pulses on the anode of the valve 23. The bias of the cathode of the valve 25 should however be so great that a channel pulse cannot switch the multivibrator over unless the corresponding gating pulse applied at terminal 45 is present. The gating pulses are also applied in negative sense to the cathode of the valve 25, and have the effect of reducing the bias so that a channel pulse which coincides with one of them is able to switch the multivibrator over. The trailing edge of the gating pulse switches the multivibrator back to its original condition, so that negative rectangular pulses are obtained from the auxiliary grid of the valve 25 whose leading edges coincide with the channel pulses, and whose trailing edges coincide with the trailing edges of the gating pulses. These output pulses are accordingly time-duration modulated, and are demodulated by the filter 26 in the usual way, the modulating waves being delivered to terminal 27.

It will be evident that positive duration-modulated rectangular pulses will be generated at the cathode of the valve 24. When the channel is in the unseized condition, these pulses will have a duration approximately equal to a quarter of the channel period, while when the channel is seized, their duration will be approximately doubled. This change in duration is employed to produce a corresponding change in the magnitude of a direct current by means of the elements in the lower half of Fig. 3. These elements include a valve 47 which is operated as a direct current amplifier and has a relay 48 connected in series between its anode and terminal 34.

The cathode of the valve 24 is connected through a resistance 49 and a condenser 50 to ground. The rectangular pulses charge the condenser relatively slowly through the resistance 49 so that the potential which the condenser reaches is considerably higher in the seized condition than in the unseized condition. The junction point of the elements 49 and 50 is connected through a rectifier 51 to a condenser 52. The rectifier has its anode connected to the condenser 50 and is biassed negatively by the source 53 through resistances 54 and 55. The bias potential is arranged to be greater than the potential acquired by the condenser 50 in the unseized condition, but less than that which it acquires in the seized condition, so that in the latter case, the condenser 52 charges up to the peak value of this potential, while in the former case it receives substantially no charge. The potential acquired by the condenser 52 is applied to the control grid of the valve 47 through a resistance 56. This grid is normally biassed nearly to cut-off by a source 57 through resistances 55 and 56, this bias being neutralised by the potential acquired by the condenser 52 when the circuit is seized. In this case, anode current flows and operates the relay 48, which closes contacts 58 and thereby operates the local signalling equipment (not shown) over conductors 59 in the usual way. A rectifier 60 has its anode connected to the control grid of the valve 47 and its cathode to ground, and is provided to prevent the control grid from becoming positive, thus preventing any excessive anode currents from being produced which might damage the valve.

The arrangement described is liable to be operated falsely when tones are tranmitted over the channel when unseized. To prevent this, a rectifier 61 is provided with a reservoir condenser 62 and a load resistance 63, and a connection thereto is taken through a blocking condenser 64 to the output of the filter 26. The demodulated tone voltage is rectified and a negative potential is built up in the condenser 62 which is applied to the control grid of the valve 47 through a pair of break contacts 65 of the relay 48. Thus a counteracting negative bias is produced when the tone is present which prevents the false operation of the relay by the tone modulated pulses applied to the condenser 50. It will be noted that if dialling signals are transmitted, the demodulated dialling impulses obtained at the output of the filter 26 will be substantially blocked by the condenser 64, if it is not chosen too large, so that in this case no counteracting bias is produced, and the relay 48 will respond to the dialling impulses as desired.

The counteracting bias is taken through the break contracts 65 because when the circuit is seized and normal conversation is proceeding it is not desired that the counteracting bias voltage which would be built up by the speech waves in condenser 62 should break down the circuit by releasing the relay again. Thus when the relay 48 is operated on the normal seizure of the circuit, the counteracting bias is cut off by the opening of the contacts 65.

While it would be possible to operate the direct current amplifying valve 47 directly by the rectangular pulses derived from the cathode of the valve 24, the change of anode current which would be produced would be small, and the operation would therefore be critical and uncertain. By providing the integrating arrangement of the resistance 49 and condenser 50 together with the blocking rectifier 51, a much bigger change in anode current is easily obtained when the channel pulses are shifted on seizure of the circuit, and the operation becomes definite and a cheap commercial relay may be used. It is found for example that a change of anode current in the ratio of 14:1 for a shift of 2 microseconds of the channel pulses can be obtained.

In the specification accompanying co-pending application No. 17,606/46 there is described an improved pulse demodulator which may be used to replace the multi-vibrator composed of the valves 23, 24 and 25 shown in Fig. 3. This demodulator produced negative duration modulated pulses at a point corresponding to the cathode of the valve 24. The elements shown in the lower half of Fig. 3 may be slightly modified for use with the improved type of demodulator mentioned above. The modification consists simply in reversing the rectifiers 51 and 61, and the biassing source 53. The valve 47 will in this case be initially biassed so that in the unseized condition the control grid is at about zero potential, and the relay 48 will be operated. When the circuit is seized, the potential of the control grid will become negative owing to the negative charge acquired by the condenser 52, and the anode current will be reduced or cut off, so releasing the relay. The contacts 58 may be modified so that they close when the relay is released.

The rectifier 60 will in this case not be required and should be omitted.

It will be understood that the rectifiers 51, 60 and 62 may be of any suitable type, such as diodes, or dry plate rectifiers. The sources 53 and 57 have been shown conventionally as batteries, but they may be any type of direct current source having appropriate voltage.

It will be evident, also, that the arrangement could be used to transmit teleprinter or other telegraph signals when not required for speech channels, so long as suitable relays 18 and 48 were provided, and if the time constants of the various circuits were suitably chosen, having regard to the speed of transmission desired.

It may be added that if desired, it may be arranged so that when the channel in one direction is seized, the operation of the relay 48 may be made to seize the corresponding channel operating in the reverse direction. The arrangements described will operate in just the same way if this is done.

What is claimed is:

1. An arrangement for communicating with control signals as well as intelligence signals over a single channel of a pulse time-displacement modulated electric pulse communication system having a transmitter and receiver; said transmitter including a pulse time displacement modulator adapted to produce recurrent pulses, each displaced over a given range of positions in accordance with the voltages applied thereto, means to establish a fixed position for the pulses in said range in the absence of modulation by intelligence signals, and means to apply the intelligence signal voltages to displace the pulses about said established fixed position in accordance with the instantaneous values of the intelligence signals, said means to establish a fixed position comprising a bias voltage source, means for applying said bias voltage to said modulator, in the absence of said control signals, to shift the pulses to a fixed position offset from the central position of said range, and means responsive to said control signals for varying said bias to fixedly displace said pulses to said central position; said receiver including a signal operated device adapted to respond to a direct potential, a direct potential source, and means responsive to the shifting of the pulses from said offset position to said central position to apply said direct potential to operate said device.

2. An arrangement according to claim 1 in which said means included in the receiver comprises means for deriving from the received channel pulses rectangular pulses whose duration is determined by the established fixed position of the channel pulses, integrating means controlled by the said rectangular pulses for building up a potential of magnitude corresponding to the said fixed position, and means for applying the said potential to operate a signal device when the said magnitude corresponds to one of the fixed positions, the last mentioned means being also adapted to block the application of the said potential when its magnitude corresponds to the other fixed position.

3. An arrangement according to claim 2 further including a condenser, and in which the last mentioned means comprises a rectifier biassed so that it blocks the said potential when of small magnitude, and applies it to charge said condenser when of large magnitude.

4. An arrangement according to claim 3 further comprising a relay, a direct current amplifier connected to control the operating current for said relay and means for applying the potential acquired by the said condenser to said direct current amplifier to produce a change in the operating current for a relay.

5. An arrangement according to claim 4 in which the said relay is adapted to operate said signal device when the channel pulses are shifted to the said central position.

6. An arrangement according to claim 5 comprising means for preventing the operation or release of the said relay when the channel pulses are time-displacement modulated with the intelligence signals.

7. An arrangement according to claim 6 in which the preventing means comprises means for demodulating the channel pulses to recover the intelligence signals, means for rectifying the said intelligence signals, and a circuit for applying the resultant rectified voltage to the said direct current amplifier for the purpose of counteracting the effect of the said potential acquired by the said condenser.

8. An arrangement according to claim 7 comprising means for preventing the application of the rectified voltage to the said amplifier when the channel pulses are time-displacement modulated with intelligence signals, and have been shifted to the said central position.

9. An arrangement according to claim 8 in which the last-mentioned means comprises a set of break contacts controlled by the said relay and adapted on operation to open said circuit.

CYRIL GORDON TREADWELL.

REFERENCES CITED

The following references are of record in the file of this patent:

UNITED STATES PATENTS

| Number | Name | Date |
|---|---|---|
| 2,272,070 | Reeves | Feb. 3, 1942 |
| 2,419,292 | Shepard | Apr. 22, 1947 |
| 2,420,374 | Houghton | May 13, 1947 |
| 2,429,613 | Deloraine | Oct. 28, 1947 |

OTHER REFERENCES

RCA Review, Dec. 1946, pages 561–575.